United States Patent [19]

Parks et al.

[11] Patent Number: 4,924,241

[45] Date of Patent: May 8, 1990

[54] PRINTHEAD FOR INK JET PRINTING APPARATUS

[75] Inventors: Ronald Parks, Marion; Anthony B. Castro, Herrin, both of Ill.

[73] Assignee: Diagraph Corporation, Herrin, Ill.

[21] Appl. No.: 388,641

[22] Filed: Aug. 1, 1989

[51] Int. Cl.[5] ........................ G01D 15/18; F16K 1/00; B05B 7/06

[52] U.S. Cl. .................................. 346/75; 346/140 R; 118/313; 251/61.1; 251/331

[58] Field of Search ............. 346/75, 140 R; 118/313; 251/61.1, 331

[56] References Cited

U.S. PATENT DOCUMENTS 4,555,719 11/1985 Arway et al. .................... 346/140 R 4,723,131 2/1988 Droit ...................................... 346/75

*Primary Examiner*—Bruce A. Reynolds

*Assistant Examiner*—Gerald E. Preston

*Attorney, Agent, or Firm*—Senniger, Powers, Leavitt and Roedel

[57] ABSTRACT

A printhead for ink jet printing comprising a front plate having a chamber therein for ink under pressure, ports extending from the chamber to the back face of the front plate, recesses in the back face, passages extending through the front plate from the recesses to its front face, the ends of the passages at the front face constituting orifices for delivery of ink onto a target surface moving past the front face, a flexible membrane held on the back face by a back plate, and members slidable in holes in the back plate releasably holding the membrane pressed against the back face of the front plate at the back ends of the ports to block flow of ink out of the back ends of the ports to the recesses and the passages and operable to release the membrane for flexing away from the back ends of the ports for delivery of ink.

32 Claims, 14 Drawing Sheets

PRINTHEAD FOR INK JET PRINTING APPARATUS

BACKGROUND OF THE INVENTION

This invention relates to printheads for ink jet printing apparatus, and more particularly to a printhead of this class having a plurality of jet orifices arranged in a matrix for discharging droplets of ink to print data on a surface moving past the printhead.

In certain respects, the invention involves improvements on the printhead disclosed in the coassigned U.S. Pat. No. 4,723,131 of Jimmy L. Droit, issued Feb. 2, 1988, which is incorporated herein by reference.

Reference may also be made to the coassigned U.S. Pat. No. 4,792,817 issued Dec. 20, 1988 for a disclosure of a printhead on which, in certain respects, the invention of said U.S. Pat. No. 4,723,131 is an improvement, and on which the present invention may be regarded as involving improvements.

Reference may also be made, as in said U.S. Pat. No. 4,723,131, to U.S. Pat. Nos. 4,215,350, 4,378,564, 4,542,386, 4,450,375, 4,555,719 and 4,576,111 for their disclosures of printheads of this class.

While the printhead disclosed in said U.S. Pat. No. 4,723,131 has been quite satisfactory for many purposes, including as stated therein the printing of relatively small characters (e.g., alphanumeric characters), it has been found that spacing of its orifices cannot be reduced for printing even smaller characters such as may be desired, the reduction of the spacing of the orifices being limited in the case of the use (as has been found desirable) of the heads or pistons designated 202 in said patent by the diameter required for these members. Thus, for example, it has been found impractical to space the orifices any closer than 0.050", characters printed with this spacing being of the order of 5/16" high. Also, the printhead disclosed in said U.S. Pat. No. 4,723,131 includes an insert designated 52 in said patent which has been found not only to add to the cost of the printhead (including assembly cost) but also adversely to affect the consistency of the printing in some instances. Further, consideration was given to utilizing the principles of the printhead disclosed in said U.S. Pat. No. 4,723,131 for printing bar codes, but it was found difficult to obtain sufficient flow of ink for such printing.

SUMMARY OF THE INVENTION

Among the several objects of this invention may be noted the provision of an improved printhead for ink jet printing apparatus of the type having a membrane such as shown in U.S. Pat. No. 4,723,131 eliminating the insert of the latter thereby simplifying the construction and assembly of the printhead; the provision of an improved construction for such a printhead enabling closer spacing of the orifices of the printhead for printing even smaller characters, e.g., of the order of 5/32" high, attaining improved flow rates of ink and improved stabilization of the size of the dots of ink which are printed on the target surface; the provision of an improved construction for such a printhead enabling ink jet printing of bar codes on target surfaces moving past the printhead; and the provision of means for minimizing problems which might otherwise be incurred on start-up of the printhead after a period during which the printhead has been out of use (e.g., overnight) due for example to drying of ink in and thereby clogging the orifices of the printhead.

In general, with regard to that phase of the invention involving elimination of the insert of the printhead disclosed in said U.S. Pat. No. 4,723,131, the improved printhead of this invention comprises a body having a front face and a back face, a chamber therein for ink under pressure, a port extending from the chamber to the back face of the body, a recess in the back face adjacent but spaced from the end of the port at the back face constituting the back end of the port, and a passage extending forward from the recess through the body to the front face of the body. The end of this passage at the front face constitutes an orifice for delivery of ink onto a target surface moving relative to the body past its front face. A flexible membrane on said back face is engageable therewith all around the back end of said port and said recess. Means is provided for releasably holding the membrane pressed against the back face of the body around said port to block flow of ink from said chamber out of the back end of said port, this holding means being operable to release the membrane for flexing away from the back end of the port for delivery of ink from said chamber through the back end of the port and thence via said recess to and through said passage.

With regard to that phase of the invention directed to printing of smaller characters, the improved printhead of this invention has a plurality of said ports and a plurality of said recesses, one for each port, said ports being spaced at intervals, each recess comprising an elongate groove extending in a direction away from the port having a first end adjacent but spaced from the back end of the port and a second end spaced from said first end, each of said grooves converging from said ports with their said second ends closer together than the ports and said passages extending through the body from the grooves adjacent their said second ends to the front face of the body for closer spacing of the passages than the ports.

With regard to that phase of the invention directed to printing bar codes, the improved printhead of this invention has a plurality of said passages extending forward from the recess through the body to the front face of the body.

Other objects and features will be in part apparent and in part pointed out hereinafter.

BRIEF DESCRIPTION OF THE DRAWINGS

Corresponding reference characters indicate corresponding parts throughout several views of the drawings.

DETAILED DESCRIPTION

Figure 1:
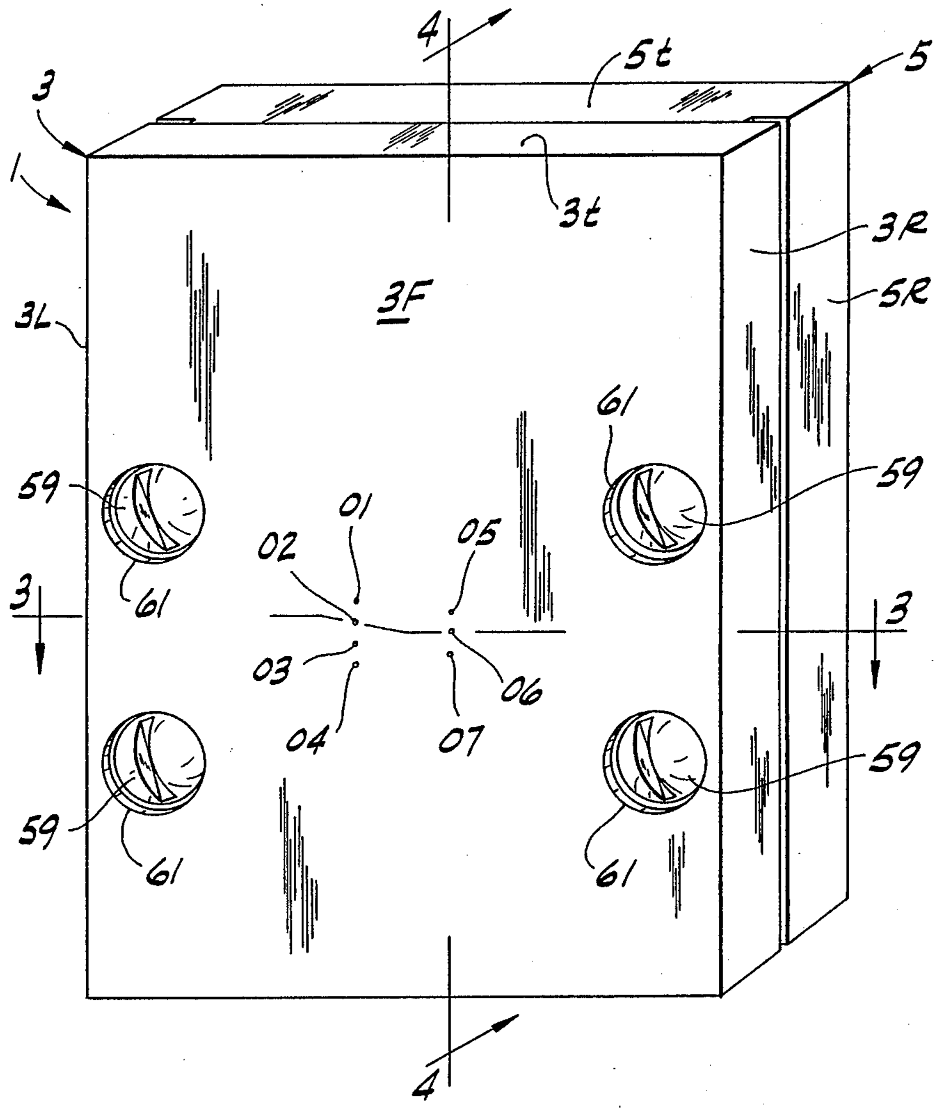
FIG. 1 is a perspective enlarged from actual size of a printhead of this invention particularly for printing small characters, viewed from the front thereof and showing seven orifices of the printhead arranged in one set of four and one of three.
Figure 2:
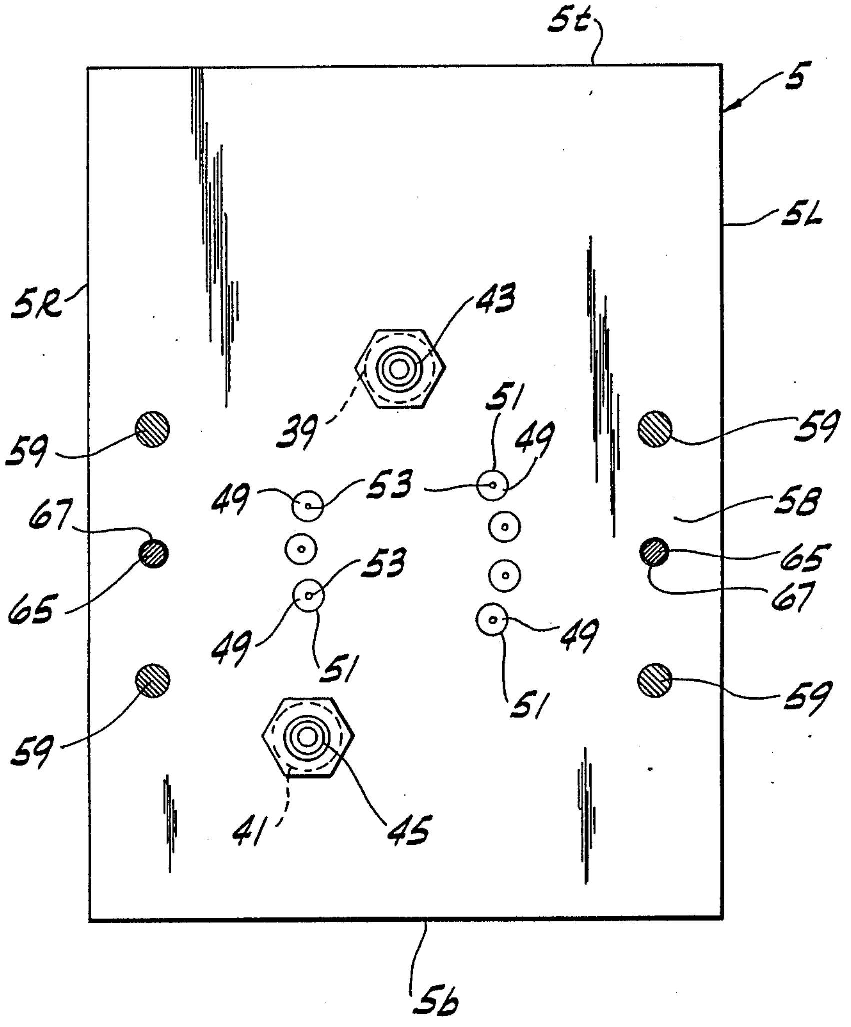
FIG. 2 is a view in elevation of the back of the FIG. 1 printhead with wires for the heads or pistons of the printhead broken away.

Referring first to FIGS. 1-9 a printhead 1 of this invention particularly for printing small characters, e.g., letters and numbers approximately 0.156" high, is shown to comprise an assembly of a body 3 constituted by a first rectangular plate, denoted as the front plate of the printhead, a second rectangular plate 5 denoted as the back plate of the printhead, and a flexible membrane 7 between the two plates. The plates may be made of any material capable of being accurately machined, and are preferably made of a graphite-containing composition. The front and back faces of the front plate 3 are designated 3F and 3B. The front face of the back plate 5 is generally designated 5F and its back face is designated 5B. The long side edges of the plates are designated 3R, 3L and 5R, 5L, respectively, R referring to the right and L to the left as viewed from the front face of the front plate 3 in the usual vertical disposition of the printhead for printing, for example, on cartons being moved past the front face 3F of the printhead by a conveyor (not shown). The short edges of the plates are designated 3*t*, 3*b* and 5*t*, 5*b*, respectively, t referring to the top and b to the bottom in the usual vertical disposition of the printhead.

The body or front plate 3 has two recesses or grooves 9 and 11, denoted as the upper groove and lower groove respectively, extending transversely of the plate in its back face 3B. Each groove has an intermediate relatively shallow portion denoted 9*a* for the groove 9 and 11*a* for the groove 11, and relatively deep ends denoted 9*b* for the groove 9 and 11*b* for the groove 11. Two holes 13 and 15 are drilled into the front plate 3 from its bottom edge 3*b*, intersecting the deep ends of groove 11 and terminating at the deep ends of groove 9. These holes extend parallel to the side edges 3L and 3R, hole 13 being adjacent the left-hand edge 3L and hole 15 being adjacent the right-hand edge 3R. The ends of the holes at the bottom edge 3*b* of the plate 3 are plugged as indicated at 17.

In the assembly of plates 3 and 5, each of the holes 13 and 15 serves as a chamber for ink under pressure. As herein illustrated, four relatively small diameter holes A1-A4 are drilled in the plate 3 from its back face 3B to the left-hand hole or chamber 13, and three small diameter holes A5-A7 are drilled in the plate 3 from its back face to the left-hand hole or chamber 15. Thus, each hole extends from the respective chamber 13, 15 to the back face 3B of the plate 3 to serve as a Port for flow of ink from the chamber back to the back face of the plate. The four ports A1-A4 at the left, constituting a first set of ports, are spaced along the length of the hole or chamber 13 preferably with ports A1 and A4 on a line L1 (see FIG. 5A) adjacent the vertical plane tangent to the inside of the hole or chamber 13 and ports A2 and A3 on a line L2 spaced outward from line L1 (and spaced slightly outward from the vertical central plane of hole 13).

By way of example, port A2 is spaced from port A1 a distance of 0.096", port A3 is spaced from port A2 a distance of 0.100" and port A4 is spaced from port A3 a distance of 0.096", these distances being measured along the length of the hole or chamber 13, i.e., measured vertically. The three ports A5-A7 at the right, constituting a second set of ports, are spaced along the length of the hole or chamber 15 preferably with ports A5 and A7 on a line L3 (again see FIG. 5A) spaced slightly inward of the vertical central plane of hole 15 and port A6 spaced slightly outward of this plane. By way of example, port A6 is spaced from port A5 and port A7 is spaced from port A6 a distance of 0.100" measured along the length of the hole or chamber 15, i.e., measured vertically. The port A6 (which is the central port of the set of three ports A5-A7) is drilled on a horizontal line L4 which extends transversely of the plate 3 midway between ports A2 and A3 of the set of four ports A1-A4.

For each of the ports A1-A7, an elongate narrow recess is provided in the back face of the plate 3 adjacent but spaced from the end of the port at the back face 3B of plate 3 constituting the back end of the port. These recesses are respectively designated B1-B7, B1 being the recess associated with port A1, B2 with A2, etc. Each of these recesses comprises an elongate relatively narrow groove or channel extending generally radially outwardly with respect to its respective port, having a first end 19 adjacent but spaced from the back end of the respective port and a second end 21 radially outward of the back end of the respective port.

Figure 3:
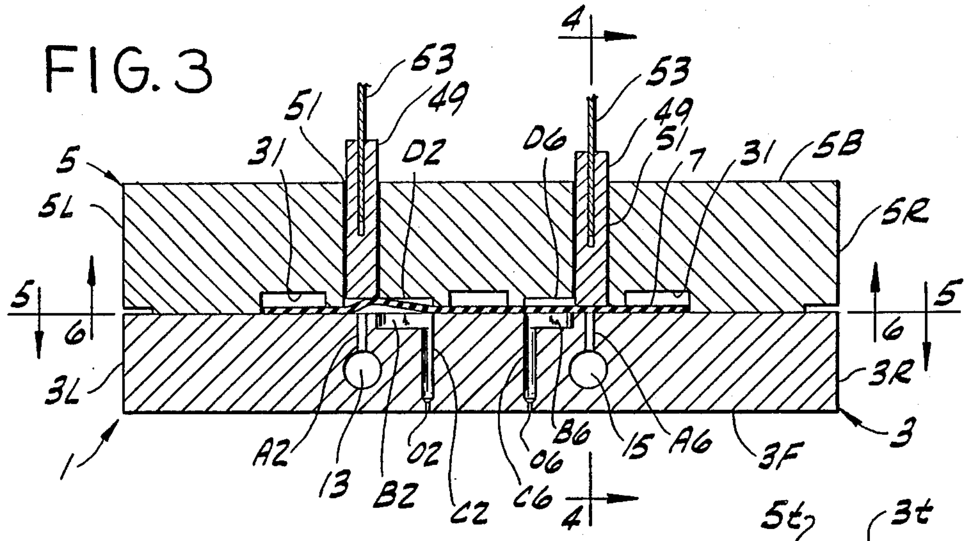
FIG. 3 is a transverse (horizontal) section generally on line 3—3 of FIG. 1, a head or piston of the printhead at the right being shown in its closed position and the head or piston at the left being shown in its open position.
Figure 4:
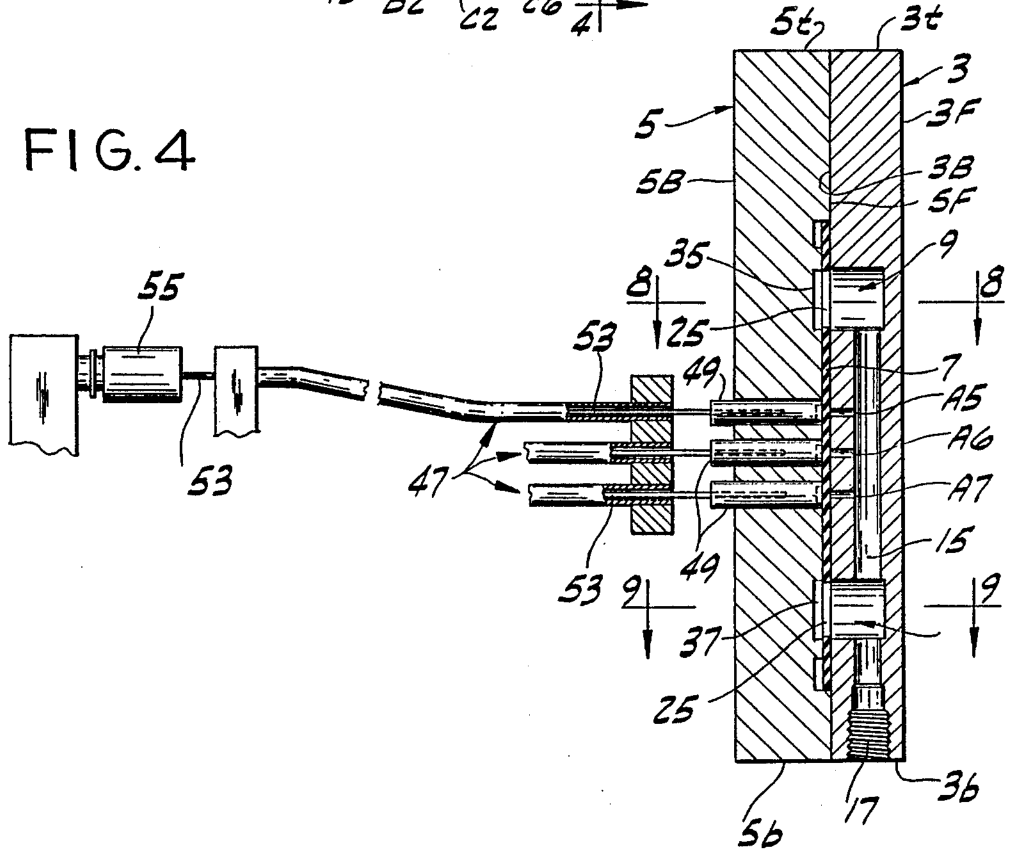
FIG. 4 is a vertical section generally on line 4—4 of FIGS. 1 and 3.
Figure 5:
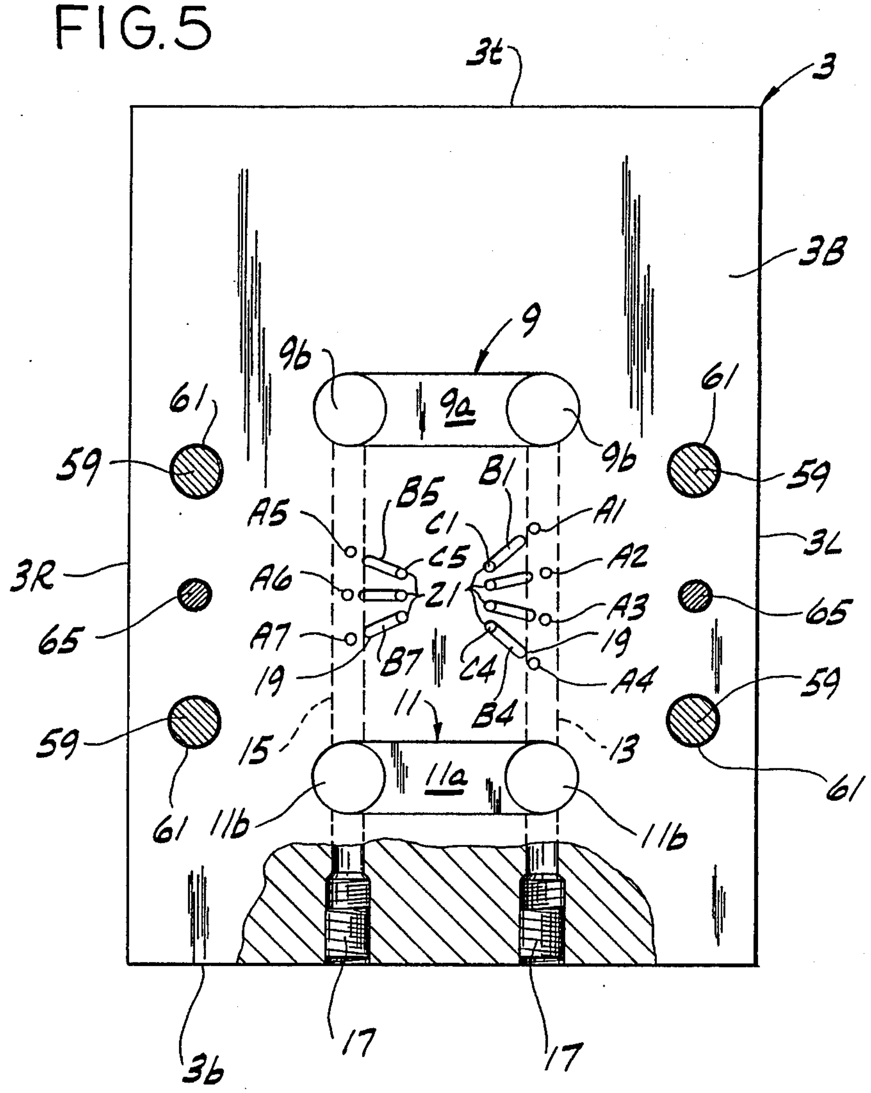
FIG. 5 is a view on line 5—5 of FIG. 3 of the back face of a front plate of the FIG. 1 printhead.
Figure 5A:
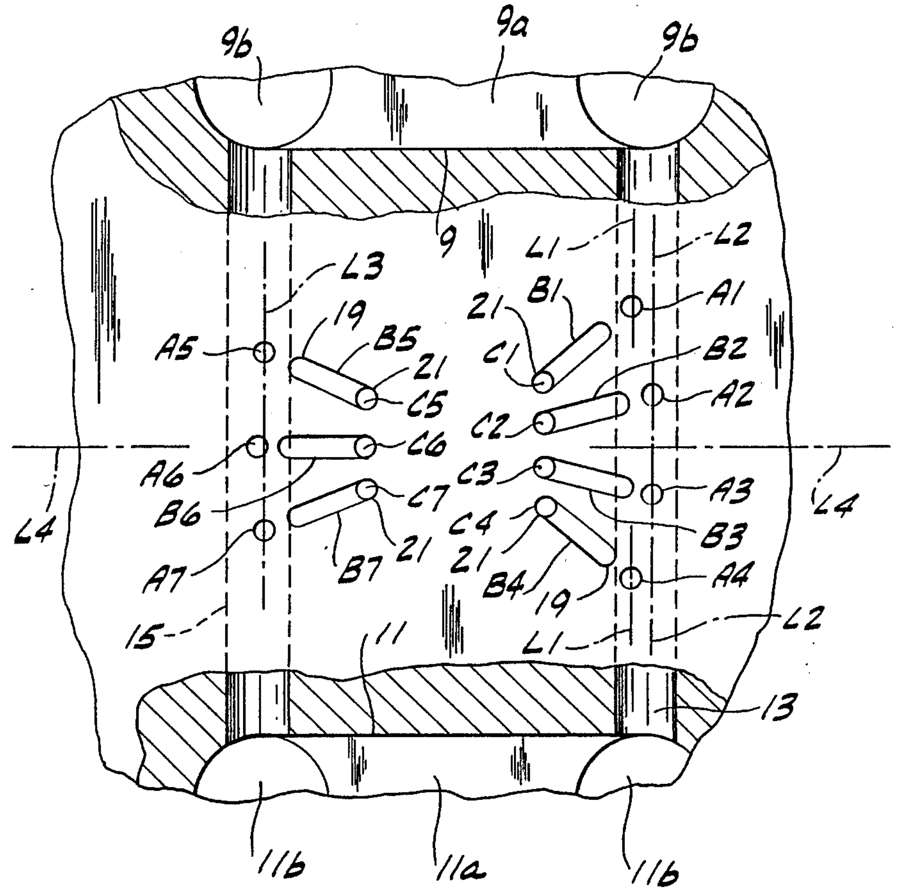
FIG. 5A is an enlarged fragment of FIG. 5 partly broken away and shown in section.
Figure 6:
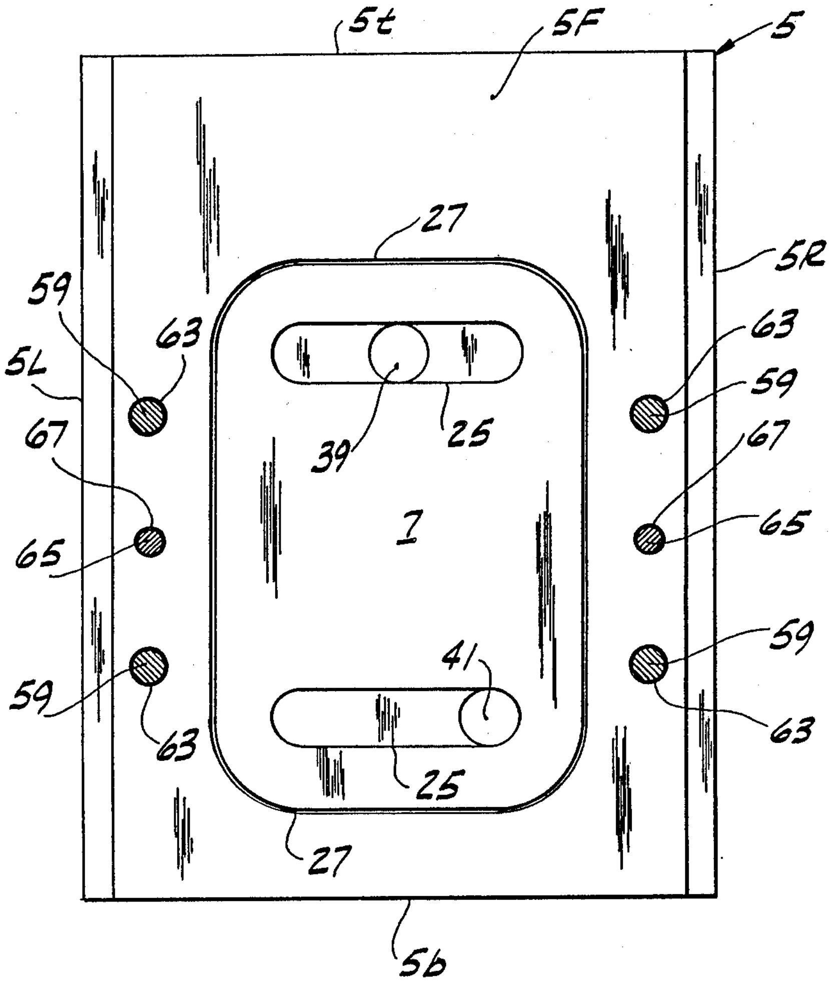
FIG. 6 is a view on line 6—6 of FIG. 3 of the front face of a back plate of the FIG. 1 printhead, and showing a membrane of the printhead.
Figure 7:
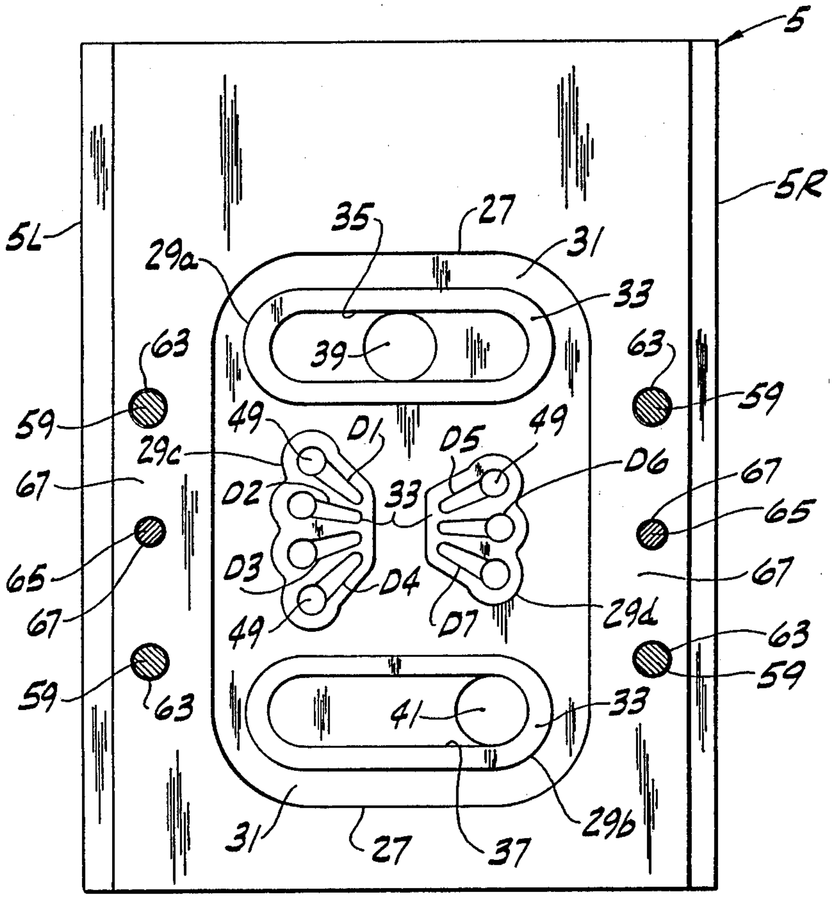
FIG. 7 is a view similar to FIG. 6 with the membrane removed.

Passages C1-C7 extend forward from the grooves or channels B1-B7, respectively, through the body or plate 3 to the front face 3F thereof. These passages are drilled through the plate with a short reduced-diameter section at the end of each passage at the front face 3F of the plate 3 constituting an orifice for delivery of ink onto the target surface (e.g., a surface of a carton) moving relative to the plate 3 past its front face. These orifices are respectively designated 01-07 (see particularly FIG. 1). As shown in FIGS. 3, 5 and 5A, each of passages C1–C7 extends from adjacent the radially outer end 21 of the respective groove or channel B1–B7 to the front face 3F of the plate 3.

The grooves or channels B1–B4 extend from ports A1–A4 toward the right as viewed from the front and the left as viewed from the back, converging from said ports with their ends 21 closer together than the ports A1–A4, for closer spacing of the passages C1–C4 and the respective orifices 01–07 than the ports A1–A4. The grooves or channels B5–B7 extend from ports A5–A7 toward the left as viewed from the front and the right as viewed from the back, converging from said ports with their ends 21 closer together than ports A5–A7, for closer spacing of the passages C5–C7 and the respective orifices 01–07 than the ports A5–A7.

The membrane 7 is constituted by a generally rectangular piece of relatively thin flexible elastomeric sheet material, e.g., rubber sheet 0.015" thick. Its width is somewhat greater than the length of the grooves 9 and 11 and its length is greater than the distance between the upper edge of the upper groove 9 and the lower edge of the lower groove 11. It has slots 25 therein registrable with the grooves 9 and 11. The back plate 5 has a recess 27 in its front face for receiving the membrane, the recess having an outline slightly larger than that of the membrane so that the membrane fits in the recess with a minimum of space between the edges of the membrane and the bounding wall in the recess (see FIG. 6). Within the bounds of the recess 27, the back plate 5 has raised areas 29 *a–d* (see particularly FIGS. 3 and 7), these areas being within the bounding wall of the recess so that there is a space 31 all around the raised areas. Each of the latter has a flat front face 33 which is spaced from the bottom of the recess 27 a distance less than the overall depth of the recess 27 so that the plane of the flat front face 33 of each raised area is slightly rearward of the plane of the back face 5B of the back plate 5.

The raised areas 29*a* and 29*b* within the recess 27 of the back plate 5 have upper and lower transverse grooves 35 and 37, respectively, which in the assembly are located directly behind the upper and lower grooves 9 and 11 in the back face 3B of the front plate 3. A hole 39 is drilled in the back plate from its back face to the groove 35 and a hole 41 is drilled in the back plate from its back face to the groove 37. Fittings such as indicated at 43 and 45 are threaded in the holes 39 and 41, respectively.

Associated with each of the seven ports A1–A7 is a means indicated generally at 47 for releasably holding the membrane 7 pressed against the back face 3B of the front plate 3 around the back end of the port (i.e., the end of the port at the back face 3B) to block the flow of ink from the respective hole or chamber 13, 15 out of the back end of the port. Each said means 47 comprises a member 49 which may be referred to as a head or piston or plunger slidable in a hole 51 extending through the back plate 5 from its back face 5B to its front face 5F on one end of a wire 53, the other end of the wire being connected to the plunger of a solenoid indicated at 55 (see FIG. 4). A spring washer (not shown) constituting an internal component of the solenoid biases the solenoid plunger and the wire in the direction toward the membrane for pressing of the membrane by the respective head or piston 49 against the back face 3B of the front plate 3 around the back end of the respective port (A1–A7). The solenoid, when energized, pulls the wire against the bias of the spring washer to pull the head 49 away from the membrane 7 to unblock the port and allow flow of ink out of its back end, and thence via the respective groove B1–B7 to the back end of the respective passage C1–C7. The back plate 5 has recesses D1–D7, one for each of the ports, in its front face (the front face of raised area 29) generally in register with the grooves B1–B7 in the back face 3B of the front plate 3 and extending from the holes 51 permitting the flexing of the portion of the membrane which surrounds or spans the back end of the port away from the back face 3B of the front plate 3 to unblock the back end of the port and allow flow of ink from the back end of the port to and through the respective groove.

The front plate 3 and back plate 5, with the membrane 7 therebetween in the recess 27, are held in assembly by screws 59 extending through holes 61 in the front plate and holes 63 in the back plate and threaded in tapped holes in a mounting member (not shown). Accurate registration of the plates is attained by means of pins 65 received in holes as indicated at 67 in the plates. The back plate 5 holds the membrane 7 in sealed relation against the back face 3B of the front plate 3 except at the inner ends of the holes 51 and the recesses D1–D7 where the membrane is permitted to flex away from the back face 3B of the front plate 3.

Figure 9:
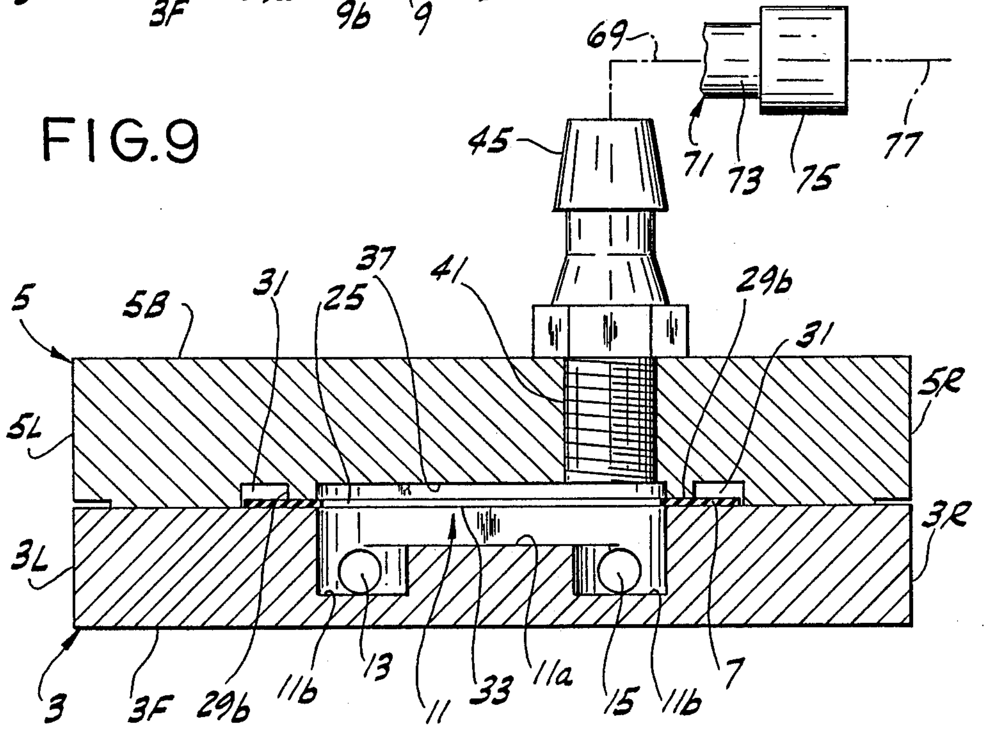

As diagrammatically illustrated in FIG. 9, conduit (tubing) 69 which is connected to fitting 45 (for ink) extends to the fitting 45 from a quick-disconnect coupling 71 for connection and disconnection of a supply of ink under pressure, the coupling having a member 73 attached to the upstream end of the conduit and a quick connect and disconnect member 75 at the end of a conduit 77 extending from the supply of ink under pressure (not shown). The coupling 71 is of a type such that when member 75 is disconnected from member 73, these members are closed, and when member 75 is connected to member 73, these members are open for supplying ink to conduit 69.

Figure 8:
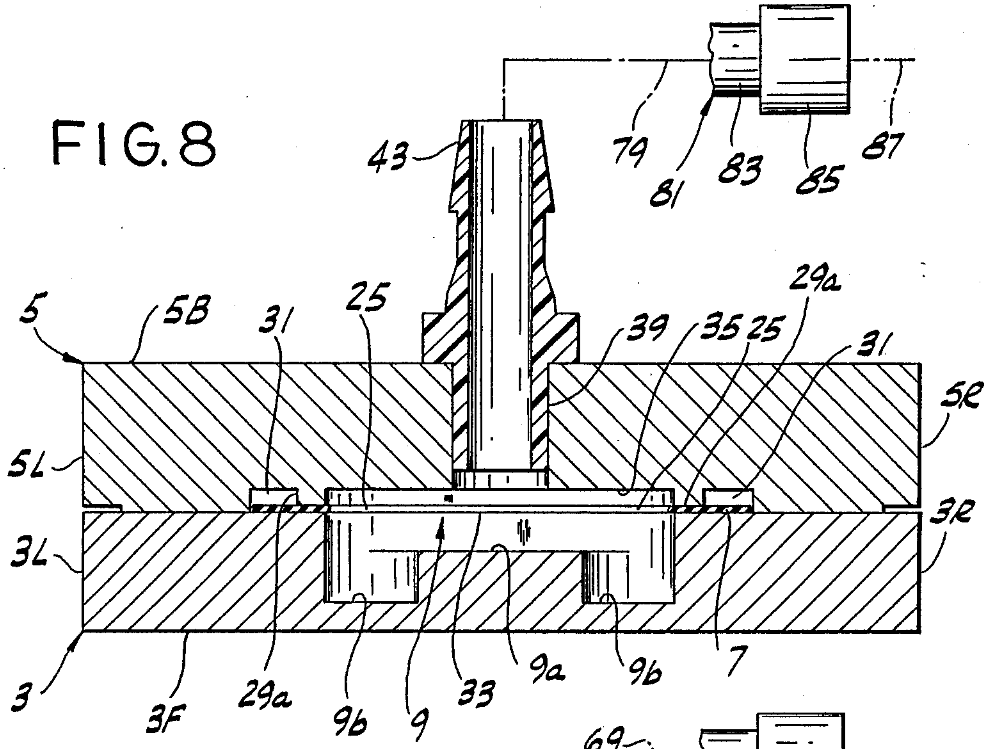
FIGS. 8 and 9 are transverse sections generally on lines 8—8 and 9—9 of FIG. 4.

As diagrammatically illustrated in FIG. 8, conduit 79 which is connected to fitting 43 extends from the fitting 43 to a quick-disconnect coupling 81 similar to coupling 71, the coupling having a member 83 attached to the upstream end of the conduit and a quick connect and disconnect member 85 at the end of a conduit 87 extending from the supply of ink under pressure (not shown). When member 85 is disconnected from member 83, these members are closed, and when member 85 is connected to member 83, these members are open.

Generally, the printhead 1 will be mounted in a housing or casing such as that indicated at 46 in the aforesaid U.S. Pat. No. 4,723,131 with the wires 53 and solenoids 55 for the heads or pistons 49 therein, the housing or casing being mounted with the printhead 1 vertically disposed in position for printing, for example, on cartons being moved past the front face 3F of the printhead by a conveyor (not shown). For printing characters, e.g., numerals, letters and graphics on the cartons, line 77 is connected by means of coupling 71 to line 69 for delivery of ink under pressure from the supply (not shown) to the ink chambers 13 and 15 in the front plate 3 of the printhead. Delivery is from the back of the back plate 5 via the fitting 45, and the passaging constituted by hole 41 and groove 37 in the back plate, the lower slot 25 in the membrane 7, and groove 11 in the back face of the front plate 3. Coupling member 85 is disconnected from member 83 to hold ink under pressure in the ink chambers. Operation of the solenoids 55 is under control of a controller (not shown), generally in the same manner as described for the solenoids in said U.S. Pat. No. 4,723,131. To print a character the controller sends the appropriate signal to the appropriate solenoids 55 for momentary activation thereof. Each solenoid, so momentarily activated, momentarily pulls the respective wire 53 to pull back the respective head or piston 49 away from the membrane 7 as shown for the head or piston for port A2 at the left in FIG. 3. This allows the membrane momentarily to flex back away from sealing engagement with the back face 3B of the front plate 3 around the back end of the respective port A1–A7 for momentarily unblocking the back end of the port, with resultant pressurization of ink in the respective groove or channel B1–B7 and passages C1–C7 and squirting of a droplet of ink out of the respective orifice 01–07. The flexing back of the membrane from the back end of the respective port A1–A7 is permitted by the respective recess D1–D7 in the front face 5F of the back plate 5, as shown for the port A2 at the left in FIG. 3 (the head or Piston 49 for this port being shown in its pulled-back retracted position in FIG. 3).

It will be observed that the construction of printhead 1 is such as to enable elimination of the insert indicated at 52 in the aforesaid U.S. Pat. No. 4,723,131. Also, the arrangement with each of ports A1–A7 relatively widely spaced from the adjacent port, with the grooves or channels B1–B7 extending radially and converging from the ports with their ends 21 closer together than the ports, and with passages C1–C7 extending from the ends 21 of the grooves to the front face 3F of the front plate 3 enables relatively close spacing of orifices 01–07 for small character printing while enabling use of heads or pistons 49 of practical diameter.

The printhead 1 may be flushed out with a solvent by connecting a conduit from a source of solvent under pressure (instead of a source of ink under pressure) to the coupling member 73 and connecting a conduit for draining off the solvent to the coupling member 83. In this way, solvent can be made to flow through the printhead for flushing it out. The flow of solvent is from fitting 45 via hole 41, groove 37, the lower slot 25 in the membrane 7, groove 11, holes 13 and 15, groove 9, the upper slot 25 in the membrane, groove 35 and hole 39 to the fitting 43.

Figure 10:
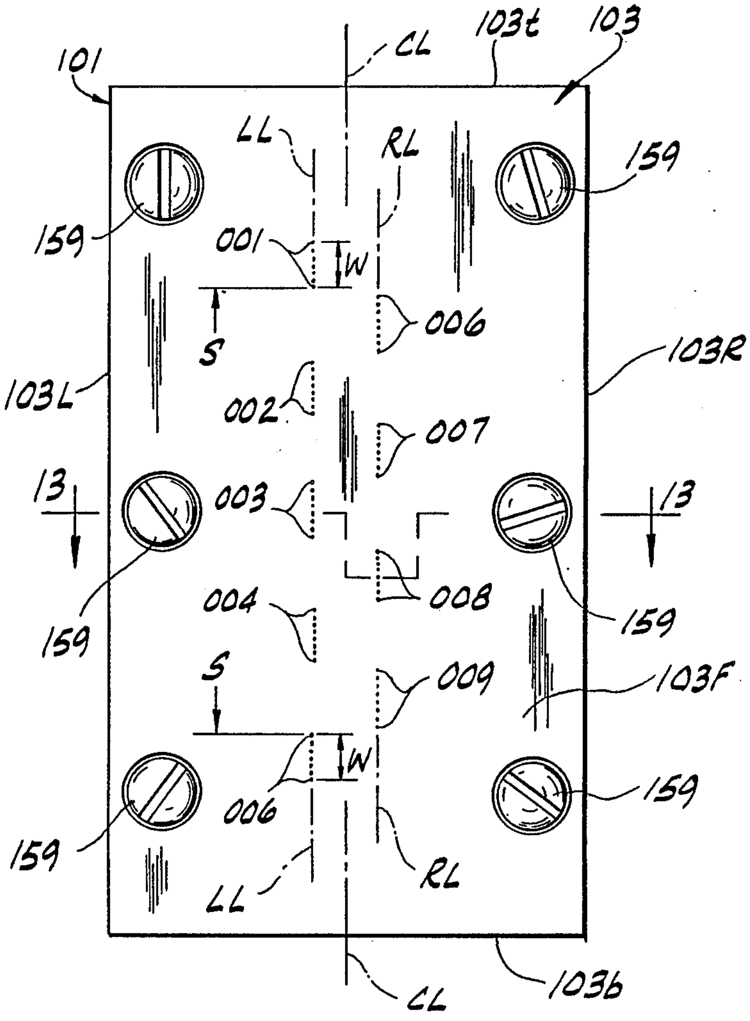
FIG. 10 is a front elevation of a printhead of this invention for printing bar codes.
Figure 11:
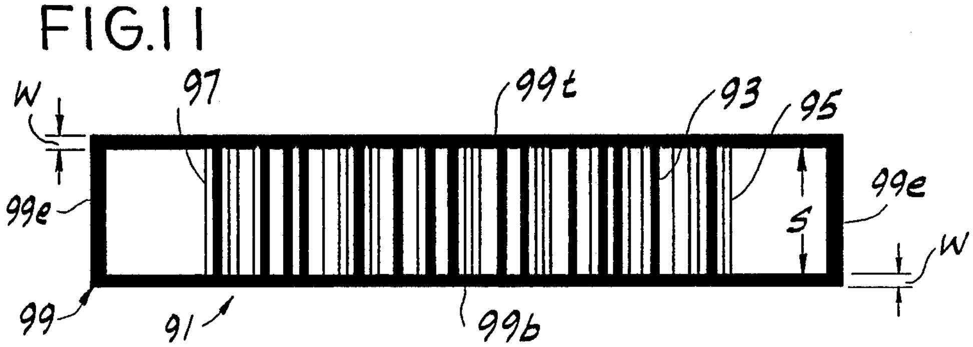
FIG. 11 is a view showing a bar code as printed by a printhead such as shown in FIG. 10.
Figure 12:
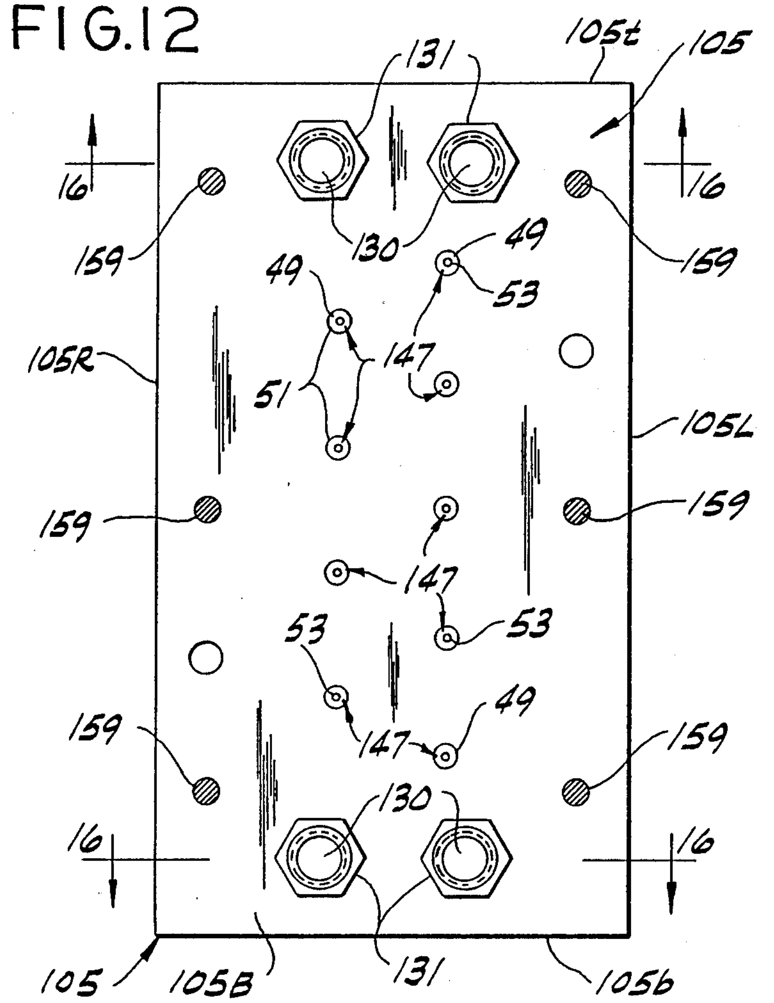
FIG. 12 is a view in elevation of the back of the printhead shown in FIG. 10.
Figure 13:
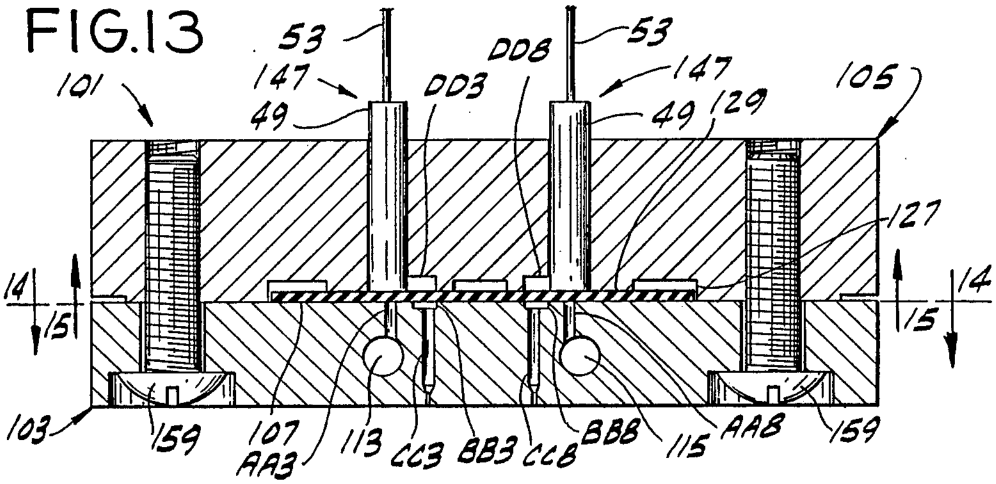
FIG. 13 is a transverse (horizontal) section generally in line 13—13 of FIG. 10.
Figure 15:
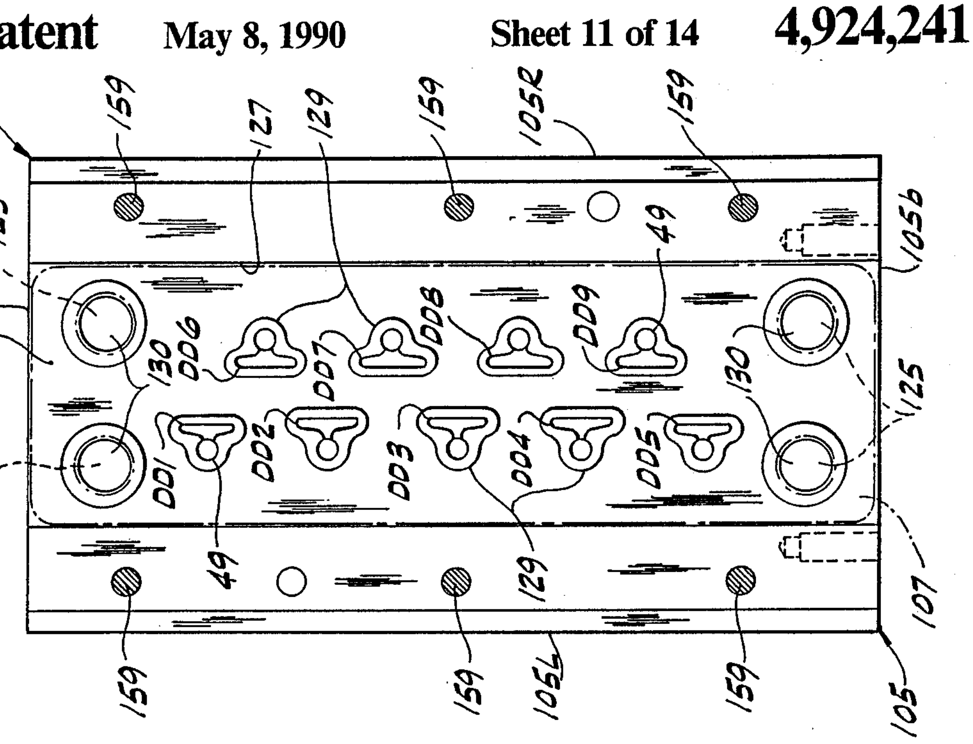
FIG. 15 is a view on line 15—15 of FIG. 13 of the front face of the back plate of the printhead shown in FIG. 10 showing in phantom the location of the membrane of the printhead.

FIGS. 10 and 12–16 illustrate a modification of the printhead 1 shown in FIGS. 1–9 particularly for printing bar codes such as the bar code shown in FIG. 11 generally designated 91 on cartons being moved past the front face of the printhead by a conveyor (not shown). The bar code comprises a series of what may be referred to as vertical symbol bars such as indicated at 93 and vertical start and stop characters 95 and 97 at the ends of the series of the vertical symbol bars, enclosed within what may be referred to as a bearer bar of relatively long narrow rectangular outline generally designated 99. The bearer bar has top and bottom relatively long horizontal portions *99t* and *99b* and vertical end portions *99e*. The latter may be at times omitted. As printed on a carton being moved past the printhead, the bar code 91 extends horizontally on one side of the carton, the bar *99t* being at the top and the bar *99b* being at the bottom.

The bar code printhead of FIGS. 10 and 12–16, designated 101 in its entirety to distinguish it from the printhead 1, is similar to the printhead 1 in comprising a body or front plate 103, a back plate 105 and a membrane 107 between the two plates. Two holes 113 and 115 (corresponding to holes 13 and 15) are drilled through the plate 103 from its bottom edge *103b* to its top edge *103t*, extending parallel to the side edges 103R and 103L of the plate. Holes 116 are drilled in the plate from its back face to the holes 113 and 115 adjacent both ends of holes 113 and 115, and both ends of the holes 113 and 115 are Plugged as indicated at 117 outward of the holes 116.

In the assembly of plates 103 and 105, each of the holes 113 and 115 (like each of holes 13 and 15) serves as a chamber for ink under pressure. As illustrated herein, five relatively small diameter holes AA1–AA5 are drilled in the plate 103 from its back face to the hole or chamber 113, and four relatively small diameter holes AA6–AA9 are drilled in the plate 103 from its back face to the hole or chamber 115. Each of these holes (like the holes A1–A7) serves as a port for flow of ink from the respective chamber back to the back face of the plate 103. The five ports AA1–AA5, which are at the left as viewed from the front, are spaced along the length of the hole or chamber 113 all in line, and the four ports AA6–AA9, which are at the right as viewed from the front, are spaced along the length of the hole or chamber 115, being staggered with respect to ports AA1–AA5. By way of example, ports AA2–AA4 are spaced 0.368", ports AA6–AA9 are also spaced 0.368", port AA1 being 0.170" above the level of port AA6, ports AA2–AA4 being at levels halfway between the levels of ports A6–A9, and port AA5 being 0.170" below the level of port AA9.

Figure 14:
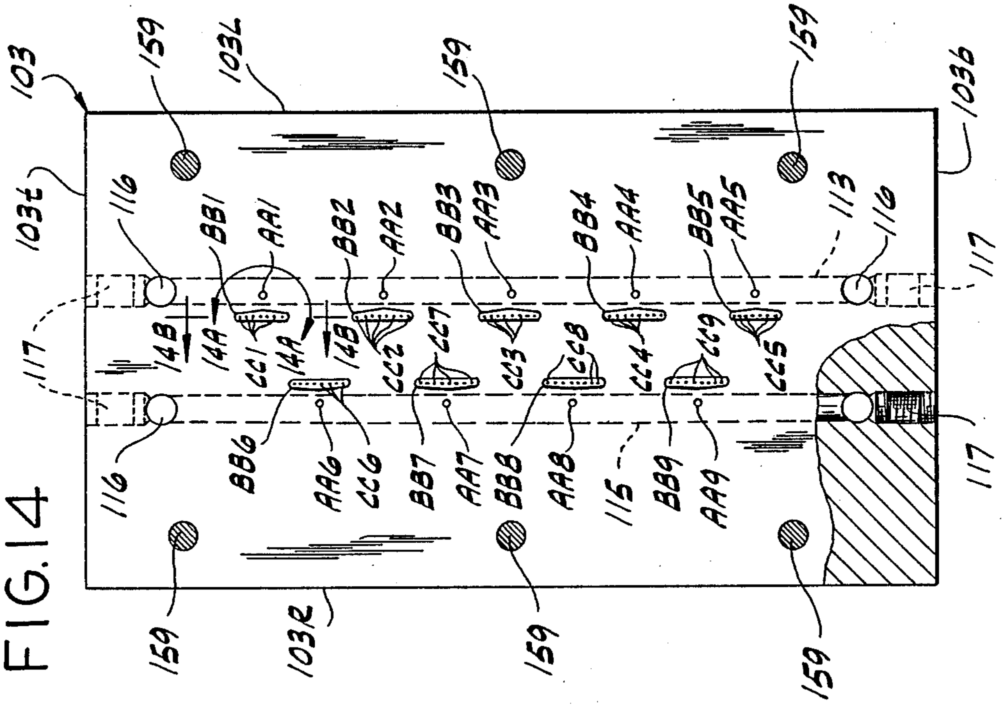
FIG. 14 is a view on line 14—14 of FIG. 13 of the back face of the front plate of the printhead shown in FIG. 10, with parts broken away and shown in section.
Figure 14A:
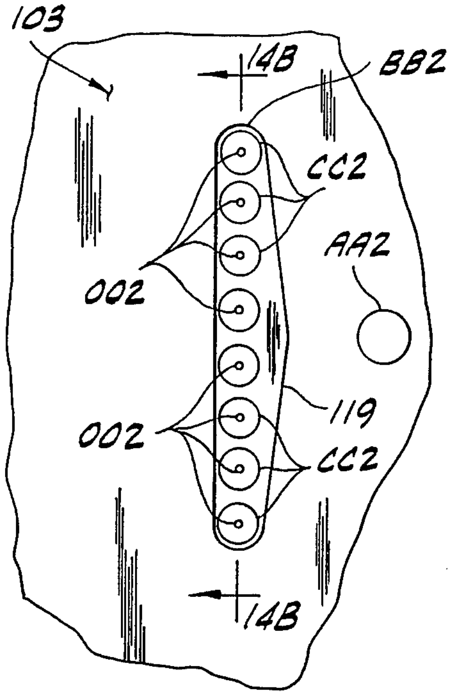
FIG. 14A is an enlarged fragment of FIG. 14.
Figure 14B:
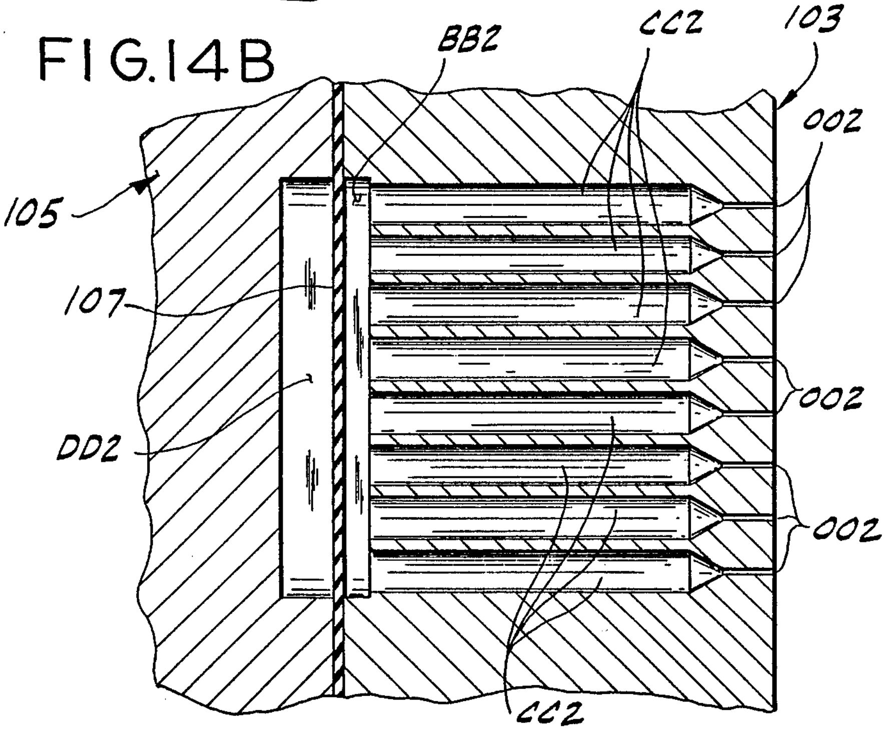
FIG. 14B is a view in section generally on line 14B—14B of FIG. 14 and FIG. 14A.
Figure 16:
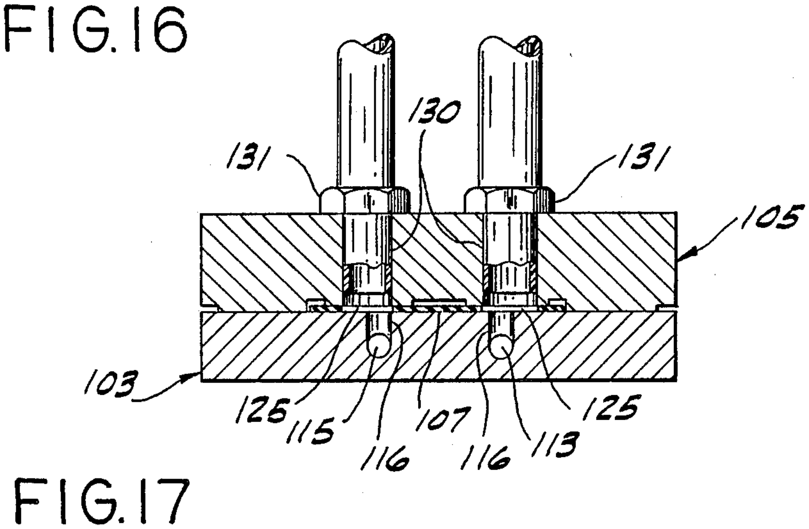
FIG. 16 is a transverse (horizontal) section on each of lines 16—16 of FIG. 12.

For each of the ports AA1–AA9 a recess is provided in the back face of plate 103 adjacent but spaced from the end of the port at the back face of plate 103 constituting the back end of the port, these recesses being respectively designated BB1–BB9, BB1 being the recess associated with port AA1, BB2 with AA2, etc. (see FIGS. 13 and 14). Each of these recesses comprises a groove or channel in the back face of plate 103 extending in heightwise direction with respect to the printhead adjacent but spaced from the back end of the respective port on the inside of the back end of the respective port, each port being located generally midway of the level of the ends of the respective recess. The outside 119 of each recess BB1–BB9 (the side toward the respective port) is bowed somewhat outward toward the port (see particularly FIG. 14A).

Each of the recesses or channels BB1–BB9 serves, in effect, as a manifold for feeding ink received from the back end of the respective port AA1–AA9 to a plurality of passages which extend forward from the bottom of the recess or channel through the body or plate 103 to the front face thereof. The passages for the groove BB1 are each designated CC1, those for the groove BB2 are each designated CC2, etc. As shown, there are eight passages for each of grooves BB2–BB4 and BB6–BB9, seven passages for each of grooves BB5 and BB1. Each passage is drilled through the plate with a short reduced-diameter section at the end of each passage at the front face of the plate 103 constituting an orifice for delivery of ink onto the target surface. The orifices are respectively designated 001–009 (see particularly FIG. 10). As to each of the recesses BB1–BB9, the passages CC1–CC9 (their back ends) are relatively closely spaced along the length of the recess, i.e., heightwise with respect to the printhead. The five recesses BB1–BB5 associated with ports AA1–AA5 are staggered with respect to the four recesses BB6–BB9 associated with ports AA6–AA9. The uppermost passage of each set of passages CC6–CC9 is at a level just below the level of the lowermost passage of the set CC1–CC5 thereabove, i.e., the uppermost passage CC6 is just below the level of the lowermost passage CC1, the uppermost passage CC7 is just below the level of the lowermost passage CC2, etc.

Referring particularly to FIG. 10, it will be observed that there are five sets of orifices 001–005, all these orifices being on a vertical line LL adjacent and on the left of the vertical center line CL of the printhead (as viewed from the front of the printhead), and four sets of orifices 006–009 all on a vertical line RL adjacent and on the right of the vertical center line. There are seven orifices 001 in the 001 set, seven orifices 005 in the 005 set, and eight in each of the other sets. Sets 001 and 005, which are the upper and lower sets on the left, are for printing the top and bottom bearer bars 99*t* and 99*b* of the bar code. The length of each of these sets, i.e., the distance between the upper and lower orifice of each set, corresponds to the desired width W for the top and bottom bearer bars. The spacing of the sets 001 and 005 corresponds to the desired spacing S for the top and bottom bearer bars. The sets 002–004 and 006–009 are for printing the vertical symbol bars 93, the vertical start and stop characters 95 and 97 and the end bearer bars 99*e*. Sets 001–005 are spaced vertically with respect to the front plate 103 of the printhead 101. Sets 006–009 are similarly spaced vertically but are in staggered relation to sets 001–005, lying opposite the spaces between the sets 001–005 so that sets 006, 002, 007, 003, 008, 004, and 009 (eight orifices in each set) are capable of printing complete uninterrupted lines for the vertical symbol bars 93, the vertical start and stop characters 95 and 97 and the end bearer bars 99*e*.

Like the membrane 7, the membrane 107 is constituted by a generally rectangular piece of relatively thin flexible elastomeric sheet material, e.g., a rubber sheet, with holes such as indicated at 125 which align with the aforesaid holes 116 in the front plate 103. The membrane is disposed in a recess 127 in the front face of the back plate 105, which has raised areas 129 (corresponding to raised areas 29*a–d*). The back plate 105 has holes such as indicated at 130 which register with holes 125 in the membrane 107 and with the holes 116 in the front plate 103, fittings 131 (like fittings 43, 45) being threaded in holes 130 for connection of lines for supplying ink under pressure to the holes or chambers 113 and 115 or flushing lines in a manner similar to that described for the printhead 1.

Associated with each of the nine ports AA1–AA9 is a means indicated generally at 147 for releasably holding the membrane 107 pressed against the back face of the front plate 103 around the back end of the port to block the flow of ink from the respective hole or chamber 113, 115 out of the back end of the port. Each said means 147 corresponds to the aforesaid means 47, and hence will not be re-described. The back plate 105 has recesses DD1–DD9, one for each of the ports AA-1–AA9, each generally in register with the respective port and the respective recess BB1–BB9 permitting the flexing of the portion of the membrane 107 which spans the back end of the port and the respective recess away from the back face of the front plate 103 to unblock the back end of the port and allow flow of ink from the back end of the port to the respective recess BB1–BB9 and thence through the respective passages CC1–CC9 leading from the recess. The plates 103, 105 and the membrane 107 are held in assembly with the membrane sandwiched between the plates by means of screws 159 corresponding to screws 59 of the printhead 1.

In similar manner to that above described for the printhead 1, the bar code printhead 101 will be mounted in a housing or casing such as that indicated at 46 in the aforesaid U.S. Pat. No. 4,723,131 along with the wires 53 and solenoids 55 for the heads or pistons 49 of the means 147, the housing being mounted with the printhead 101 vertically disposed in position for printing bar codes such as the bar code 91 illustrated in FIG. 11 extending horizontally on cartons being moved past the front face 103F of the printhead by a conveyor (not shown). Ink under reassure is supplied via the lower fittings 131, for example, to the ink chambers 113 and 115, the upper fittings 131 being ink being held under pressure in the two chambers in the same manner as in the FIGS. 1–9 embodiment. Operation of the solenoids for the printhead 101 is under control of a controller (not shown) which functions to send appropriate signals to the appropriate solenoids for momentary actuation thereof to Pull back the respective heads or pistons 49 of the respective means 147. This allows the membrane 107 to flex back away from sealing engagement with the back face of the front plate 103 around the back end of the respective port AA1–AA9 for momentarily unblocking the back end of the port with resultant pressurization of ink in the respective recess BB1–BB9 and passages CC1–CC9 and squirting of droplets of ink out of the orifices 001–009 of the respective set. The flexing back of the membrane 107 from the back end of the respective port AA1–AA9 is permitted by the respective recess DD1–DD9 in the front face of the back plate 105.

For printing the top and bottom bearer bars 99*t* and 99*b*, the solenoids for controlling the sets of orifices 001 and 005 are rapidly repetitively actuated for the Period of time it takes the carton to move from the point where the bars 99*t* and 99*b* are to start (their leading ends) to the point where they are to end (their trailing ends). For printing the relatively wide end bearer bars 99*e*, relatively wide start and stop characters at 95 and 97 and relatively wide vertical symbol bars 93, the solenoids for controlling the sets of orifices 002–008 are rapidly repetitively actuated for the period of time it takes the carton to move through the desired width for the bar or character. It will also be readily understood that with cartons traveling, for example, from left to right as viewed in FIG. 10, the discharge of droplets of ink from orifices 006–009 is timed in accordance with the rate of travel of the carton so that the discharge from orifices 006–009 completes a bar or character as initiated by the discharge from orifices 001–005.

Figure 17:
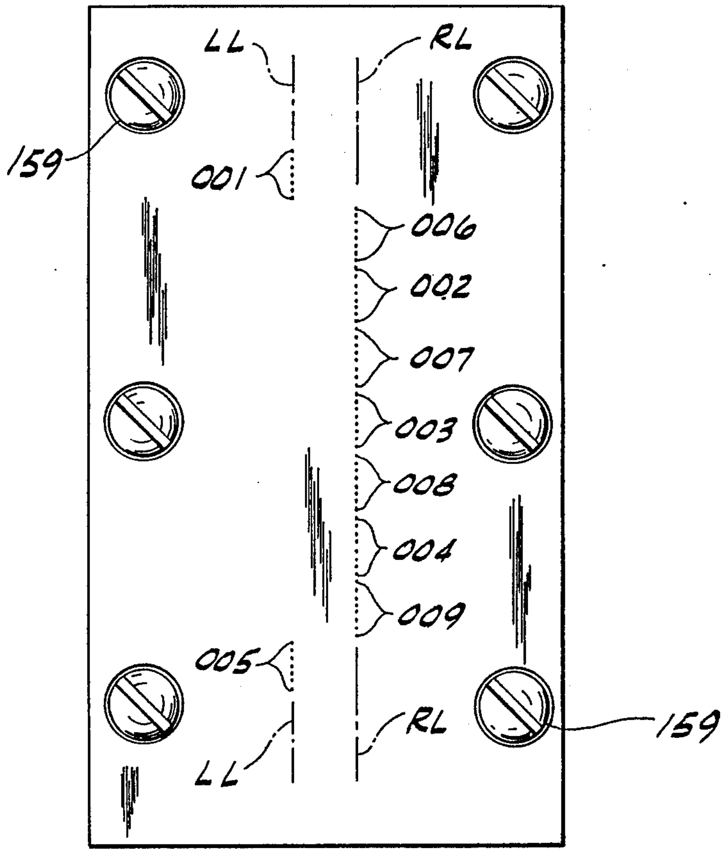
FIG. 17 is a view similar to FIG. 10 showing a modification thereof.

FIG. 17 illustrates a modification of the embodiment of FIGS. 10 and 12–16 for printing bar codes wherein the sets of orifices 001 and 005 for printing the top and bottom bearer bars 99*t* and 99*b* are again arranged on line LL but the sets of orifices 002–004, instead of being arranged on line LL along with the sets 001 and 005, are arranged on line RL in line with the sets 006–009, with set 002 between sets 006 and 007, set 003 between sets 007 and 008, and set 004 between sets 008 and 009. It will be understood that the ports AA1–9, the recesses BB1–BB9, the passages CC1–CC9 and the recesses DD1–DD9 are appropriately arranged for the stated disposition of the sets of orifices 001 and 005 on line LL and sets 006, 002, 007, 003, 008, 004 and 009 on line RL.

Figure 18:
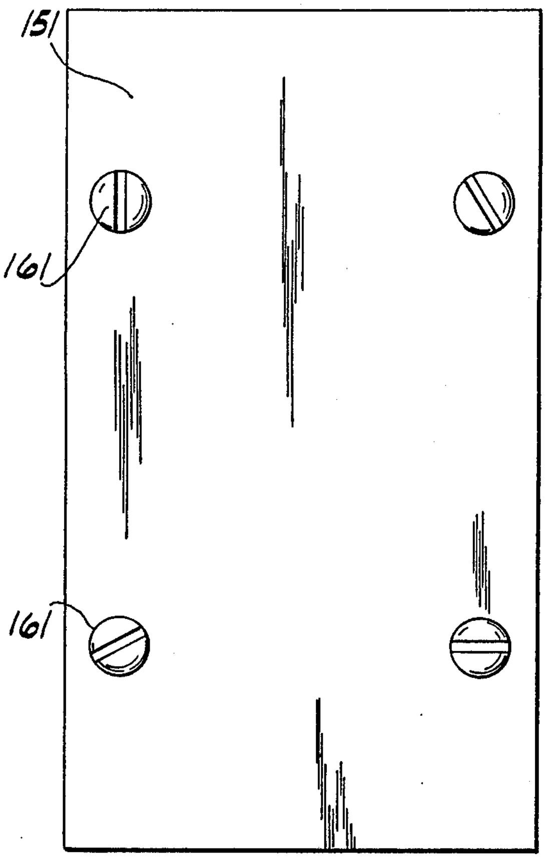
FIG. 18 is a front elevation of a cover plate which may be used with the printheads of FIGS. 1, 10 and 17.
Figure 20:
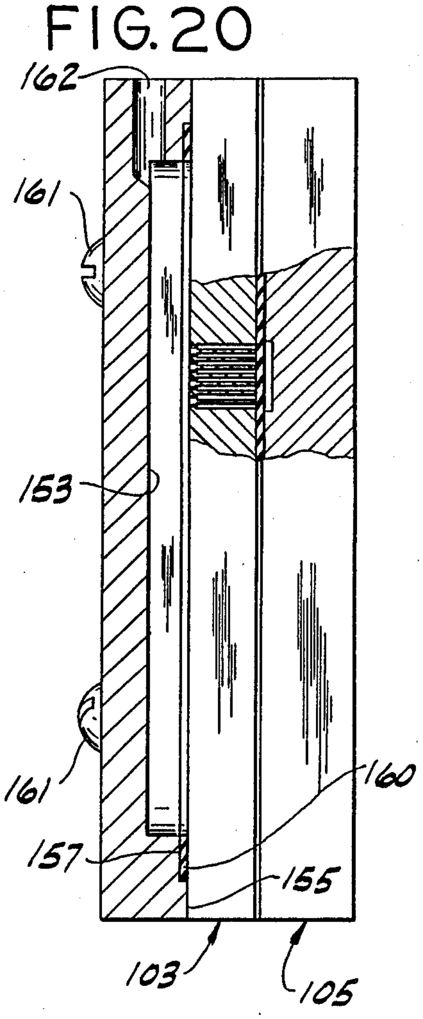
FIGS. 19 and 20 are sections generally on lines 19—19 and 20—20 of FIG. 18.
Figure 19:
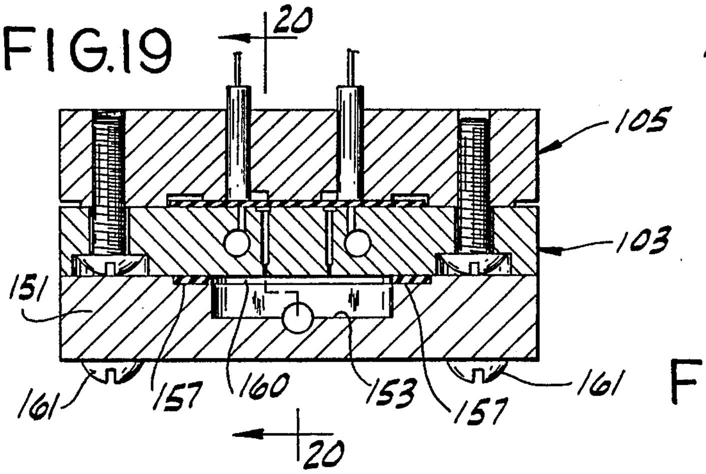

FIGS. 18–20 illustrate a means applicable to any of the above-described embodiments for inhibiting drying out of ink in and resultant clogging of the orifices (01–09, 001–009) during extended periods (e.g., overnight) when the printhead is out of use. This means comprises a rectangular cover plate 151 the height and width of which correspond to the height and width of the front plate of the printhead. This cover plate has a recess 153 in one face 155 thereof, with a groove 157 around the recess in said one face bounding the orifices. A gasket 159 of suitable elastomeric material, e.g., a suitable rubber, is inset in this groove. The gasket in its uncompressed state, is slightly thicker than the depth of the groove and thus projects beyond the face 155 of the cover plate. The latter is provided with holes 160 for accepting screws 161 for securing it on the outside face of the front plate of the printhead with the gasket compressed all around its margin and thereby in sealing engagement with the front face of the front plate to seal off the recess 153, so that the recess may be filled with an ink solvent via a hole 162 at the top of the plate 151 and its solvent held in the recess at the front of the orifices.

Figure 21:
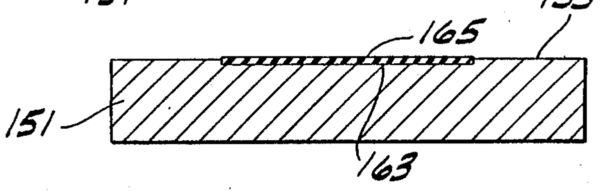
FIG. 21 is a view showing modification of the cover plate of FIGS. 18-20.

FIG. 21 illustrates a modification of the cover plate of FIGS. 18–20 with a shallow recess 163 receiving a membrane 165, the latter being inset in the recess. The membrane in its uncompressed state is slightly thicker than the depth of the recess. When the cover plate is secured on the outside face of the front plate of the printhead, the membrane is compressed and seals the orifices. It may be coated with an ink solvent.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A printhead for ink jet printing apparatus comprising:

a body having a front face and a back face, a chamber in the body for ink under pressure, a port extending from the chamber to the back face of the body, a recess in the back face of the body adjacent but spaced from the end of the port at the back face constituting the back end of the port, a passage extending forward from the recess through the body to the front face of the body, the end of said passage at said front face constituting an orifice for delivery of ink onto a target surface moving relative to the body past its front face, a flexible membrane on said back face engageable therewith all around the back end of said port and said recess, and means for releasably holding the membrane pressed against the back face of the body around the back end of said port to block flow of ink from said chamber out of the back end of said port, said holding means being operable to release the membrane for flexing away from the back end of the port for delivery of ink from said chamber through the back end of the port and thence via said recess to and through said passage.

2. A printhead as set forth in claim 1 wherein the recess comprises an elongate groove extending in a direction away from the port having a first end adjacent but spaced from the back end of the port and a second end spaced from said first end.

3. A printhead as set forth in claim 1 wherein the body comprises a plate constituting a front plate of the printhead and wherein the membrane is held against the back face of said front plate by a back plate, said back plate having a front face engaging the membrane, a back face and a hole for said holding means extending therethrough from its back face to its front face in line with said port, said back plate further having a recess in its front face generally in register with the recess in the back face of said front plate and extending from said hole, said hole and said recess in said back plate permitting flexing of the portion of the membrane which surrounds the back end of said port away from the front plate to unblock the back end of said port and allow flow of ink from the port to and through the recess in the back face of the front plate.

4. A printhead as set forth in claim 3 wherein the holding means for the membrane comprises a member slidable in the hole and biased toward the membrane for pressing the membrane against the back face of the front plate around the back end of said port, and a solenoid for pulling said member away from the membrane.

5. A printhead as set forth in claim 2 particularly for small character printing having at least one set of said ports and a plurality of said grooves, one groove for each port of said set, said ports being spaced at intervals, said grooves converging from said ports with their said second ends closer together than the ports and said passages extending through the body from the grooves adjacent their said second ends to the front face of the body for closer spacing of the passages than the ports, and a plurality of said holding means, one for each port.

6. A printhead as set forth in claim 5 wherein the chamber is constituted by a hole in the body extending from an edge of the body, said ports being spaced at intervals along said hole, the passages extending through the body at one side of the hole.

7. A printhead as set forth in claim 6 wherein the body comprises a plate constituting a front plate of the printhead and wherein the membrane is held against the back face of said front plate by a back plate, said back plate having a front face engaging the membrane, a back face and a plurality of holes, one for each of said holding means, extending therethrough from its back face to its front face in line with said ports, said back plate further having recesses in its front face, one for each port, each generally in register with a respective recess in the back face of said front plate and extending from the respective hole, each said hole and recess in said back plate permitting flexing of the portion of the membrane which surrounds the back end of the respective port away from the front plate to unblock the back end of said port and allow flow of ink from the port to and through the respective recess in the back face of the front plate.

8. A printhead as set forth in claim 7 wherein each holding means comprises a member slidable in the respective hole and biased toward the membrane for pressing the membrane against the back face of the front plate around the back end of the respective port, and a solenoid for pulling the said member away from the membrane.

9. A printhead as set forth in claim 1 particularly for bar code printing having a plurality of said passages extending forward from the recess through the body to the front face of the body.

10. A printhead as set forth in claim 9 wherein the orifices are arranged in a pattern for printing a bearer bar, symbol bars, and start and stop characters for the bar code.

11. A printhead as set forth in claim 10 wherein the orifices are arranged in a pattern comprising an upper set of orifices for printing an elongate top bearer bar, a lower set for printing an elongate bottom bearer bar, and a plurality of sets intermediate the upper and lower sets for printing vertical symbol bars, start and stop characters and end bearer bar portions extending between the top and bottom bearer bars, and having a plurality of said ports and recesses, one port and one recess for each set of orifices, each recess having a plurality of said passages extending forward therefrom.

12. A printhead as set forth in claim 11 wherein the sets of orifices are arranged in two parallel lines with the sets on one line staggered with respect to the sets on the other.

13. A printhead as set forth in claim 11 wherein the upper and lower sets of orifices are arranged on one line and the intermediate sets are arranged on another line parallel thereto.

14. A printhead as set forth in claim 11 wherein each recess is generally elongate in heightwise direction relative to the printhead, the passages which extend forward from each recess and the respective orifices being spaced heightwise.

15. A printhead as set forth in claim 14 wherein each recess has a widened portion generally centrally of its length adjacent but spaced from the back end of the respective port.

16. A printhead for ink jet printing apparatus comprising:

a front plate having a front face, a back face, and top and bottom edges, said plate having an elongate chamber therein for ink under pressure, a set of ports extending from the chamber to the back face of the front plate spaced at intervals along the length of the chamber, a set of recesses, one for each port, in the back face of the front plate adjacent but spaced from the end of the port at the back face of the front plate constituting the back end of the port, at least one passage extending forward from each recess through the front plate to its front face, the end of each passage at said front face constituting an orifice for delivery of ink onto a target surface moving relative to the body past its front face;

a flexible membrane on said back face of the front plate engageable therewith all around the back end of each said port and each said recess, a back plate having a front face and a back face secured on the back of the front plate with the membrane therebetween, said back plate and front plate having passaging for supplying ink under pressure through the back plate from the back of the back plate to the chamber, and means associated with the back plate for releasably holding the membrane pressed against the back face of the front plate around the back end of each said port to block flow of ink from the chamber out of the back end of the port, said holding means being operable to release the membrane for flexing away from the back end of each said port for delivery of ink from the hole through the back end of the port and thence via the respective recess to and through the respective passage.

17. A printhead as set forth in claim 16 particularly for small character printing wherein each recess comprises an elongate groove extending away from the respective port generally in radial direction relative to the port, each recess having a first end adjacent but spaced from the back end of the respective port and a second end spaced from the first end, said ports being spaced at intervals along said chamber, and said grooves converging from said ports with their said second ends closer together than the ports and said passages extending through the front plate from the grooves adjacent their second ends to the front face of the front plate for closer spacing of the passages and orifices than the ports.

18. A printhead as set forth in claim 17 wherein the back plate has holes therein for said holding means extending from the back face to the front face of the back plate in line with said ports, said holding means for each port comprising a member slidable in the respective hole and biased toward the membrane for pressing the membrane against the back face of the front plate around the back end of the respective port, and solenoids for pulling said members away from the membrane, and wherein the back plate has recesses in its front face, one for each recess in the back face of the front plate and generally in register therewith, permitting flexing of the portions of the membrane which surround the back ends of said ports away from the front plate to unblock the back ends of said ports and allow flow of ink from each port to and through the respective recess in the back face of the front plate.

19. A printhead as set forth in claim 18 wherein said elongate chamber is formed by a hole drilled in the front plate from one of said edges, said passaging supplying ink to said hole via a hole in the membrane.

20. A printhead as set forth in claim 16 particularly for bar code printing having a plurality of said passages extending forward from each recess through said front plate to the front face thereof.

21. A printhead as set forth in claim 20 wherein the passages and orifices are arranged in a pattern for printing a bearer bar, symbol bars, and start and stop characters for the bar code.

22. A printhead as set forth in claim 21 having two said chambers and a plurality of said ports extending from each chamber, a said recess for each said port, and a set of said passages extending from each of said recesses, the sets of passages and the respective orifices being arranged in a pattern comprising an upper set of orifices for printing an elongate top bearer bar, a lower set for printing an elongate bottom bearer bar, and a plurality of sets intermediate the upper and lower sets for printing vertical symbol bars, start and stop characters and end bearer bar portions extending between the top and bottom bearer bars, and having a plurality of said ports for each chamber, said passaging supplying both said chambers.

23. A printhead as set forth in claim 22 wherein the sets of orifices are arranged in two parallel lines with the sets on one line staggered with respect to the sets on the other.

24. A printhead as set forth in claim 22 wherein the upper and lower sets of orifices are arranged on one line and the intermediate sets are arranged on another line parallel thereto.

25. A printhead as set forth in claim 22 wherein each recess is generally elongate in heightwise direction relative to the printhead, the passages which extend forward from each recess and the respective orifices being spaced heightwise.

26. A printhead as set forth in claim 25 wherein each recess has a widened portion generally centrally of its length adjacent but spaced from the back end of the respective port.

27. For a printhead such as set forth in claim 3 having a plurality of orifices at the front face, means for inhibiting drying out of ink in the orifices comprising a cover plate having a recess in one face thereof for holding an ink solvent at the front of the orifices, and means for removably securing said cover plate on the front face of the front plate of the printhead with the recess facing said front plate.

28. Means as set forth in claim 27 wherein the cover plate has a hole for providing ink solvent in the recess and a gasket around the recess.

29. Means as set forth in claim 28, said cover plate having holes for receiving fastening means for removably fastening it on the front face of the front plate of the printhead.

30. For a printhead such as set forth in claim 3 having a plurality of orifices at the front face, means for covering the orifices comprising a membrane of elastomeric material and means for holding the membrane in sealing engagement with the front face of the front plate of the printhead to seal off the orifices.

31. Covering means as set forth in claim 30 wherein the means for holding the membrane comprises a cover plate having said membrane inset in one face thereof and projecting beyond said face for being compressed between said face and the front face of the front plate of the printhead.

32. Covering means as set forth in claim 31 wherein said cover plate has holes for receiving fastening means for removably fastening it on the front face of the front plate of the printhead.

* * * * *